United States Patent
Kondo et al.

(10) Patent No.: US 9,190,659 B2
(45) Date of Patent: Nov. 17, 2015

(54) SECONDARY BATTERY AND A METHOD FOR MANUFACTURING THE SECONDARY BATTERY

(75) Inventors: Shigeo Kondo, Hirakata (JP); Yasumasa Takeuchi, Kawasaki (JP); Yoshiharu Ajiki, Fujimi-cho (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1817 days.

(21) Appl. No.: 11/896,054

(22) Filed: Aug. 29, 2007

(65) Prior Publication Data

US 2008/0070113 A1   Mar. 20, 2008

(30) Foreign Application Priority Data

Aug. 31, 2006   (JP) ................................. 2006-237070

(51) Int. Cl.
*H01M 4/13* (2010.01)
*H01M 4/70* (2006.01)
(Continued)

(52) U.S. Cl.
CPC ............ *H01M 4/139* (2013.01); *H01M 4/0404* (2013.01); *H01M 4/0414* (2013.01); *H01M 4/13* (2013.01); *H01M 4/70* (2013.01); *H01M 4/78* (2013.01); *H01M 10/0427* (2013.01); *H01M 10/0436* (2013.01); *H01M 10/052* (2013.01); *H01M 10/0562* (2013.01); *H01M 10/0585* (2013.01); *B32B 37/10* (2013.01); *B32B 2457/10* (2013.01); *H01M 2010/0495* (2013.01); *H01M 2220/30* (2013.01); *H01M 2300/0071* (2013.01); *H01M 2300/0091* (2013.01); *Y02E 60/122* (2013.01)

(58) Field of Classification Search
CPC ..... H01M 4/0404; H01M 4/13; H01M 4/139; H01M 4/70; H01M 4/78; H01M 10/0436; H01M 10/052; H01M 10/0562; H01M 10/0585
USPC .................. 429/162, 188, 233, 304, 318, 322
See application file for complete search history.

(56) References Cited

U.S. PATENT DOCUMENTS 4,965,151 A * 10/1990 Takada et al. ................. 429/219
5,955,218 A *  9/1999 Crespi et al. ................. 429/219
(Continued)

FOREIGN PATENT DOCUMENTS

CN   A-1449589   10/2003
CN   A-1531130    9/2004
(Continued)

OTHER PUBLICATIONS

Machine Translation for Sakai et al., JP 2004-220812 A.*
(Continued)

*Primary Examiner* — Edu E Enin-Okut
(74) *Attorney, Agent, or Firm* — Oliff PLC

(57) ABSTRACT

A secondary battery that can avoid reduction in battery capacity over the lapse of charge-discharge cycles and can exhibit high performance is provided. The secondary battery includes a first electrode layer, a second electrode layer, and an electrolyte layer provided between the first and second electrode layers, the electrolyte layer including electrolyte particles, wherein at least one of the first and second electrode layers includes a base member having a major surface on which a plurality of concave portions are formed and an electrode material filled in at least the concave portions, the major surface facing to the electrolyte layer.

15 Claims, 7 Drawing Sheets

(51) Int. Cl.
*H01M 10/052* (2010.01)
*H01M 4/139* (2010.01)
*H01M 4/04* (2006.01)
*H01M 4/78* (2006.01)
*H01M 10/04* (2006.01)
*H01M 10/0562* (2010.01)
*H01M 10/0585* (2010.01)
*B32B 37/10* (2006.01)

(56) References Cited

U.S. PATENT DOCUMENTS

| | | | |
|---|---|---|---|
| 6,090,505 A | 7/2000 | Shimamura et al. | |
| 6,653,019 B1 | 11/2003 | Shimamura et al. | |
| 6,664,006 B1 * | 12/2003 | Munshi | 429/305 |
| 6,821,675 B1 | 11/2004 | Morigaki et al. | |
| 6,824,920 B1 | 11/2004 | Iwamoto et al. | |
| 7,427,455 B2 * | 9/2008 | Lee et al. | 429/233 |
| 2004/0043294 A1 | 3/2004 | Fukui et al. | |
| 2004/0161670 A1 | 8/2004 | Kawase et al. | |
| 2004/0166409 A1 * | 8/2004 | Takada et al. | 429/245 |
| 2004/0234847 A1 | 11/2004 | Mino et al. | |
| 2005/0064291 A1 * | 3/2005 | Sato et al. | 429/233 |
| 2005/0074671 A1 * | 4/2005 | Sugiyama et al. | 429/231.95 |
| 2007/0059604 A1 * | 3/2007 | Kim et al. | 429/234 |

FOREIGN PATENT DOCUMENTS

| | | | | |
|---|---|---|---|---|
| JP | 56120074 A | * | 9/1981 | H01M 4/70 |
| JP | 04034865 A | * | 2/1992 | H01M 10/38 |
| JP | A-4-34865 | | 2/1992 | |
| JP | 05013102 A | * | 1/1993 | H01M 10/38 |
| JP | A-05-013102 | | 1/1993 | |
| JP | 05205730 A | * | 8/1993 | H01M 4/14 |
| JP | 2000164252 A | * | 6/2000 | H01M 10/40 |
| JP | A-2000-173587 | | 6/2000 | |
| JP | A-2000-173588 | | 6/2000 | |
| JP | A-2002-231221 | | 8/2002 | |
| JP | A-2003-151542 | | 5/2003 | |
| JP | A-2004-207113 | | 7/2004 | |
| JP | 2004220812 A | * | 8/2004 | H01M 4/24 |
| JP | A-2005-032643 | | 2/2005 | |
| WO | WO 2006019064 A2 | * | 2/2006 | H01M 10/40 |

OTHER PUBLICATIONS

Steven D. Jones et al.; "A thin-film solid-state microbattery;" *Journal of Power Sources*; 43-44; 1993; pp. 505-513.

Kazuya Iwamoto et al.; "Solid State Lithium Battery with $Li_2FeS_2$ as Anode Material;" *Denki Kagaku*; vol. 66, No. 9; 1998; pp. 935-938. (with abstract & partial translation).

Noboru Aotani et al.; "Synthesis and electrochemical properties of lithium ion conductive glass, $Li_3PO_4$—$Li_2S$—$SiS_2$;" *Solid State Ionics*; vol. 68; 1994; pp. 35-39.

* cited by examiner

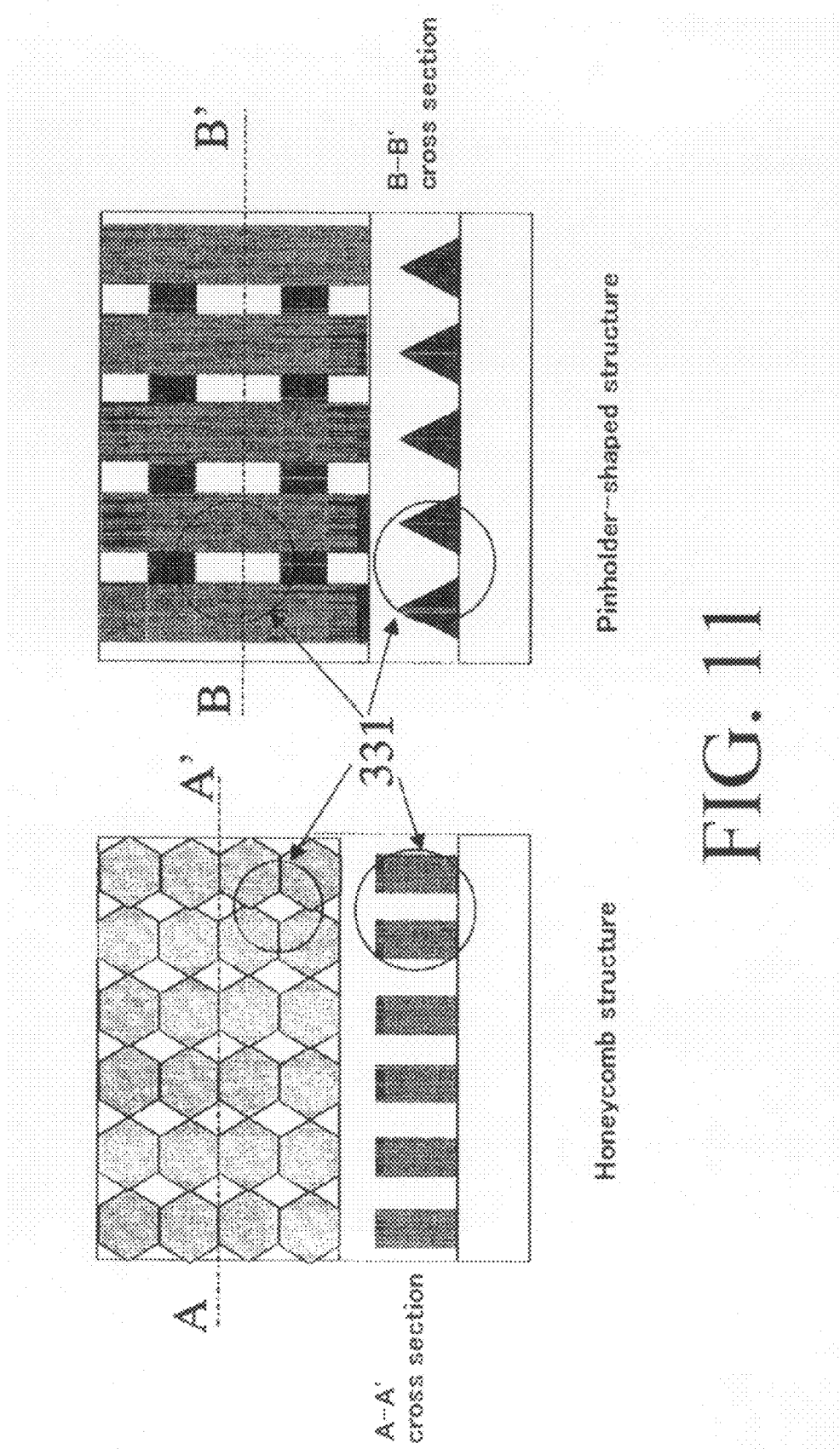

SECONDARY BATTERY AND A METHOD FOR MANUFACTURING THE SECONDARY BATTERY

CROSS-REFERENCE TO RELATED APPLICATION

This application claims a priority to Japanese Patent Application No. 2006-237070 filed on Aug. 31, 2006 which is hereby expressly incorporated by reference herein in its entirety.

BACKGROUND

1. Technical Field

The present invention relates to a secondary battery and, more particularly, a secondary battery whose electrolyte layer is mainly composed of electrolyte particles, and a method for manufacturing the secondary battery.

2. Related Art

Along with development of portable equipments such as a personal computer and a cellular phone, demand for a small-sized lightweight battery as a power source of the portable equipments shows a drastic increase in recent years.

In particular, it is predicted that a lithium battery realizes a high energy density since lithium has a reduced atomic weight and increased ionization energy. Extensive research has been made in this respect, as a result of which the lithium battery is widely used as a power source of the portable equipments these days.

Expansion of a lithium battery market demands a lithium battery having a higher energy density. In order to comply with such a demand, internal energy of the lithium battery has been made greater by increasing the quantity of an active material contained in the battery.

Concomitant with this trend, a noticeable increase has been made in the quantity of organic solvent contained in an electrolyte (electrolytic solution) which is a flammable material filled in the battery. This results in an increased danger of battery firing and, therefore, the problem of battery safety becomes at issue in recent years.

One of highly effective methods for assuring the safety of a lithium battery is to replace the electrolyte containing the organic solvent with a nonflammable solid electrolyte. Among others, use of a lithium-ion-conducting inorganic solid electrolyte makes it possible to develop an all-solid lithium battery that exhibits improved safety. Active research is now being made in this connection.

As an example, S. D. Jhones and J. R. Akridge, J. Power Sources, 43-44, 505 (1993) discloses an all-solid thin film lithium secondary battery produced by sequentially forming a cathode thin film, an electrolyte thin film and an anode thin film through the use of a deposition apparatus or a sputtering apparatus. It was reported that the thin film lithium secondary battery exhibits superior charge-discharge cycle characteristics of several thousand cycles or more.

With this thin film lithium secondary battery, however, it is impossible for a battery element to retain an electrode active material in a large quantity, thereby making it difficult to obtain a high capacity battery. In order to increase the battery capacity, a great quantity of electrode active materials should be contained in an electrode, for the purpose of which there is a need to construct a bulk type battery.

The bulk type battery is typically manufactured by compression-molding the entire battery element within a mold of a press machine, taking out the battery element from the mold and placing the battery element into a coin type (R621) battery container. However, in the case of the bulk type battery, particularly, an all-solid lithium secondary battery using a sulfide-based lithium-ion-conducting solid electrolyte, it is known that the capacity thereof is reduced by about 7% from its initial capacity when subjected to several cycles of charge-discharge operations at most (see, e.g., DENKI KAGAKU, 66, No. 9 (1998)).

Thus, there is currently a demand for development of a secondary battery (bulk type all-solid secondary battery) having improved performance and being capable of preventing reduction of a battery capacity over the lapse of charge-discharge cycles.

SUMMARY

Accordingly, it is an object of the present invention to provide a secondary battery that can avoid reduction in battery capacity over the lapse of charge-discharge cycles and can exhibit high performance, and a method for manufacturing the secondary battery.

A first aspect of the invention is directed to a secondary battery. The secondary battery comprises a first electrode layer, a second electrode layer, and an electrolyte layer provided between the first and second electrode layers, the electrolyte layer including electrolyte particles, wherein at least one of the first and second electrode layers includes a base member having a major surface on which a plurality of concave portions are formed and an electrode material filled in at least the concave portions, the major surface facing to the electrolyte layer.

According to the above secondary battery, it is possible to suppress or prevent expansion and contraction (deformation) of the electrode layer which occur when the secondary battery is in use (charge-discharge operation). This makes it possible to suppress or prevent formation or generation of gaps (spaces) between the electrolyte particles contained in the electrolyte layer, or separation of the electrode layer and the electrolyte layer. Furthermore, it becomes also possible to increase the mechanical strength of the secondary battery as a whole.

As a result, it is possible to prevent breakage of an electronic bond in the electrode layer, or disconnection of an ion-conducting path in the electrode layer, between the electrode layer and the electrolyte layer or in the electrolyte layer during the charge-discharge operations.

This makes it possible to provide a secondary battery that can avoid reduction in battery capacity over the lapse of charge-discharge cycles and can exhibit high performance.

A second aspect of the invention is directed to a secondary battery. The secondary battery comprises a first electrode layer, a second electrode layer, and an electrolyte layer provided between the first and second electrode layers, the electrolyte layer including electrolyte particles, wherein at least one of the first and second electrode layers includes a base member having a major surface on which a plurality of convex portions are formed and an electrode material provided so as to cover the convex portions, the major surface facing to the electrolyte layer.

According to the above secondary battery, it is also possible to suppress or prevent expansion and contraction (deformation) of the electrode layer which occur when the secondary battery is in use (charge-discharge operation). This makes it possible to suppress or prevent formation or generation of gaps (spaces) between the electrolyte particles contained in the electrolyte layer, or separation of the electrode layer and the electrolyte layer. Furthermore, it becomes also possible to increase the mechanical strength of the secondary battery as a whole.

As a result, it is possible to prevent breakage of an electronic bond in the electrode layer, or disconnection of an ion-conducting path in the electrode layer, between the electrode layer and the electrolyte layer or in the electrolyte layer during the charge-discharge operations.

This makes it possible to provide a secondary battery that can avoid reduction in battery capacity over the lapse of charge-discharge cycles and can exhibit high performance.

In the above secondary battery, it is preferred that the base member is provided for preventing or suppressing expansion of the electrode material in the plane direction of the electrode layer.

This makes it possible to exhibit the function of restricting the expansion of the electrolyte layer and the electrode layer in the plane direction thereof but not in the thickness direction thereof noticeably.

In the above secondary battery, it is preferred that the base member has a circumference surface thereof, and at least the circumference surface has conductivity for making the current density in the electrode layer uniform.

This makes it possible to make the current density in the electrode layer uniform when the secondary battery is charged and discharged. This suppresses emergence of a region where the electric current flows locally. As a result, it is possible to suppress or prevent the separation of the electrode layer and the electrolyte layer. Therefore, it is possible to suitably suppress degradation of charge-discharge characteristics of the secondary battery.

In the above secondary battery, it is preferred that the electrode material contains an electrode active material and a solid electrolyte material.

This makes it possible to increase adhesion between the electrode layer and the electrolyte layer. This ensures that ions are smoothly transferred between the electrode layer and the electrolyte layer, which makes it possible to improve the characteristics (charge-discharge characteristics) of the secondary battery.

In the above secondary battery, it is preferred that the electrolyte particles are composed of a silver ion conductor, a lithium ion conductor, or a mixture thereof.

A third aspect of the invention is directed to method for manufacturing a secondary battery including a laminated body having a first electrode layer, a second electrode layer and an electrolyte layer provided between the first and second electrode layers, the electrolyte layer including electrolyte particles, wherein at least one of the first and second electrode layers includes a base member having a major surface on which a plurality of concave portions are formed and an electrode material filled in at least the concave portions, the major surface facing to the electrolyte layer.

The method for manufacturing a secondary battery comprises preparing the first and second electrode layers and the electrolyte particles, providing the electrolyte particles onto the first electrode layer, providing the second electrode layer onto the electrolyte particles, pressing the second electrode layer toward the first electrode layer so that the electrolyte layer is formed, and the first and second electrode layers and the electrolyte layer are joined together to obtain the laminated body, wherein the electrode layer is formed through a method which comprises preparing the base member and providing an electrode material layer including the electrode material onto the major surface of the base member.

According to the above method for manufacturing a secondary battery, it is possible to manufacture a secondary battery that can suppress breakage of an electronic bond between electrode active material particles contained in the electrode layer, or disconnection of an ion-conducting path between the electrode active material particle and an electrolyte particle contained in the electrode layer during the charge-discharge operations.

This makes it possible to avoid reduction in battery capacity over the lapse of charge-discharge cycles and exhibit high performance in the manufactured secondary battery.

In the above method for manufacturing a secondary battery, it is preferred that the laminated body has an end portion and a restrictor provided so as to cover at least the end portion of the laminated body for restricting expansion of the electrolyte layer in the plane direction thereof, and wherein the method further comprises providing an insulating material in a liquid state on the laminated body and then solidifying the insulating material in a liquid state to obtain the restrictor.

This makes it possible to exhibit the function of restricting expansion of the electrode layer and the electrolyte layer in the plane direction thereof noticeably in the manufactured secondary battery. Further, by doing so, it is also possible to reduce the cost of production when mass-produced.

In the above method for manufacturing a secondary battery, it is preferred that the electrode layer is formed by pressing the electrode material layer against the major surface of the base member.

This makes it possible to easily improve flatness of the electrode material layer, that is, to form the first electrode layer having a smooth surface.

In the above method for manufacturing a secondary battery, it is preferred that the electrode layer is formed by applying a liquid material containing the electrode material onto the major surface of the base member.

This makes it possible to easily improve flatness of the electrode material layer, that is, to form the first electrode layer having a smooth surface.

In the above method for manufacturing a secondary battery, it is preferred that the liquid material is applied by a screen printing.

By applying the electrode material using the screen printing, the thin electrode layer can be formed.

BRIEF DESCRIPTION OF THE DRAWINGS

FIG. 11 is a pattern diagram illustrating configurations of the other base members.

DESCRIPTION OF EXEMPLARY EMBODIMENTS

The present inventor has conducted the following study in an effort to clarify the cause of capacity reduction of a secondary battery that occurs along with the lapse of charge-discharge cycles.

First, a silver-ion-conducting all-solid secondary battery was prepared by using a silver ion conductor ($Ag_6I_4WO_4$) as a solid electrolyte, using δ-type silver vanadate (δ-$Ag_{0.7}V_2O_5$) as a cathode active material and using metallic silver (Ag) as an anode active material. Then, a study was made on the distribution of an electric current flowing in the battery at the time of charging and discharging the latter.

The silver-ion-conducting all-solid secondary battery was manufactured in the following manner.

Step I: An electrode mixture (electrode material) was first prepared by mixing δ-$Ag_{0.7}V_2O_5$ (cathode active material) and $Ag_6I_4WO_4$ (solid electrolyte) in a weight ratio of 5:5.

Figure 7:
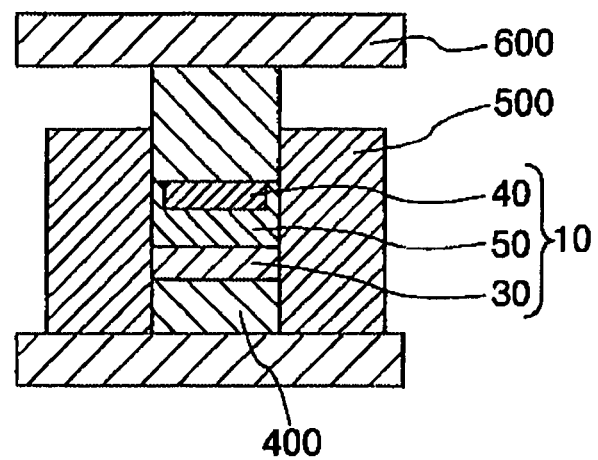
FIG. 7 is a vertical section view showing a mold for producing a battery element.

Step II: Next, as shown in FIG. 7, 65 mg of the electrode mixture was filled in a cylindrical hole of 1 cm in diameter of a female mold 500 in a state that a lower male mold 400 was inserted into the cylindrical hole of the female mold 500.

Step III: Next, an upper male mold 600 was inserted into the cylindrical hole of the female mold 500, and then the electrode mixture was preliminarily pressure-molded into a disc-shaped cathode 30 at a pressure of 0.5 ton/cm². Thereafter, the upper male mold 600 was removed from the female mold 500.

Step IV: Next, 100 mg of solid electrolyte powder (particles) was filled in the cylindrical hole without having to remove the cathode 30. And then, the upper male mold 600 was inserted into the cylindrical hole again and the solid electrolyte powder was pressed, whereby the cathode 30 was integrally molded with a disc-shaped electrolyte layer 50. Thereafter, the upper male mold 600 was removed from the female mold 500.

Figure 8:
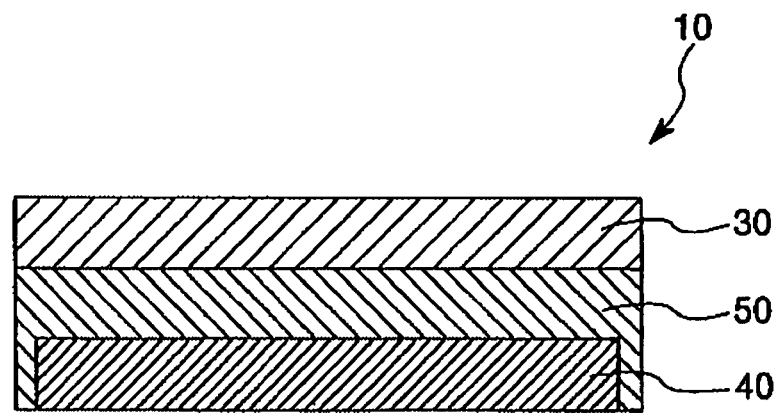
FIG. 8 is a vertical section view showing a configuration of the battery element.

Step V: Next, a disc-shaped metallic silver plate having a thickness of 100 μm and a diameter of 0.95 cm was inserted into the cylindrical hole as an anode 40. And then, the upper male mold 600 was inserted into the cylindrical hole again and pressure-molding was performed at a final pressure of 4 tons/cm², thereby producing a battery element (laminated body) 10 in which the electrolyte layer 50 was interposed between the cathode 30 and the anode 40, as illustrated in FIG. 8.

Alternatively, the battery element (laminated body) 10 may be produced by independently pressure-molding the cathode 30, the anode 40 and the electrolyte layer 50 in advance, placing them one above another, and pressing them into an integral body.

Step VI: The battery element 10 was received in a coin type battery container 70 having a structure shown in FIG. 9. Thereafter, the battery element 10 was covered with a sealing plate 90 in a state that a packing 80 was interposed between the coin type battery container 70 and the sealing plate 90, and the battery container 70 was sealed off by pressing the sealing plate 90 against the battery container 70 through the use of a press machine.

Figure 9:
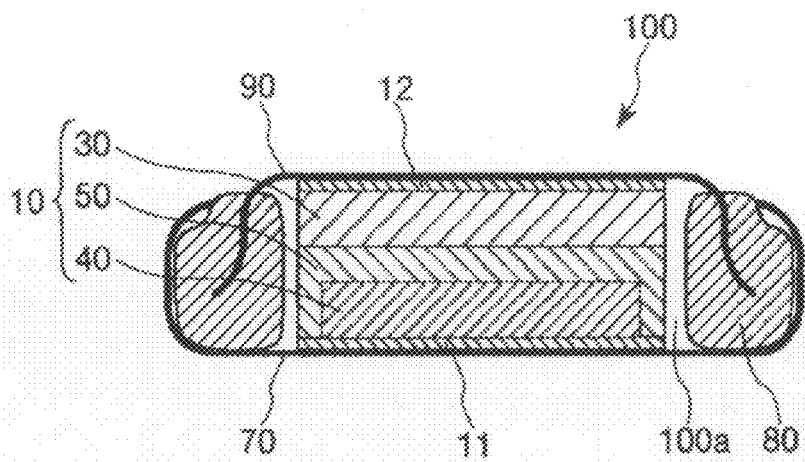
FIG. 9 is a vertical section view showing a configuration of a coin type secondary battery.

In this way, a silver-ion-conducting all-solid secondary battery 100 was obtained in which a gap 100a was left around the battery element 10 within the battery container 70 (lest the periphery (surface) of the battery element 10 should be pressured strongly). In FIG. 9, reference numeral 11 designates a copper-made anode collector and reference numeral 12 designates a copper-made cathode collector.

If the secondary battery 100 is charged, silver that constitutes the cathode active material of the cathode 30 is turned to silver ions which in turn are separated from the cathode 30 and moved into the electrolyte layer 50. Subsequently, the thus separated silver ions move toward a silver plate interface of the anode 40 where the silver ions are electrically reduced and deposited as metallic silver. A discharge reaction proceeds in the opposite order.

The secondary battery 100 was charged and discharged with a constant current density of 0.1 mA/cm², a final charge voltage of 0.55 V at 50 μA and a final discharge voltage of 0.2 V. The results were that the secondary battery 100 could not be charged and discharged from the lapse of about ten cycles, during which time the battery capacity tended to be decreased each time the charge-discharge cycles were repeated.

Figure 10:
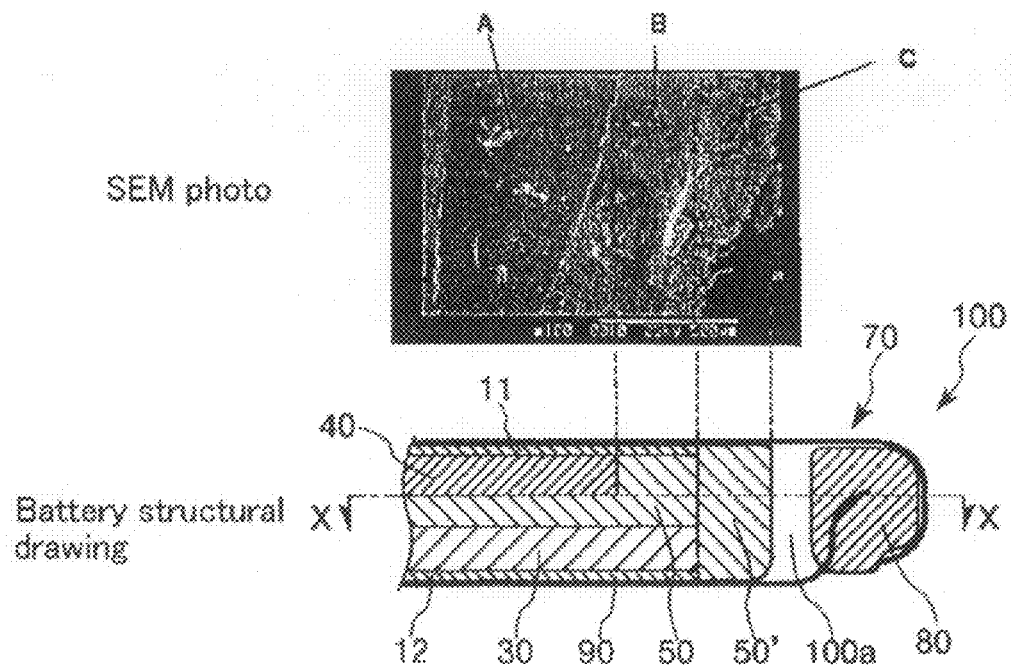
FIG. 10 is a contrast view which contrasts a scanning electron microscope (SEM) photo of a cross section taken along line X-X in FIG. 10 to a vertical section view showing a configuration of the secondary battery.

Next, the secondary battery 100 that has shown capacity reduction and lost its ability to charge and discharge electricity was disassembled to examine the cross section taken along line X-X in FIG. 10 by use of a scanning electron microscope (hereinafter referred to as "SEMN"). A photo taken by the SEM is illustrated in FIG. 10, which has a vertical section view of the secondary battery 100 showing the portions corresponding to the SEM photo.

As is apparent from the SEM photo, branch-like metallic silver was deposited in the outer periphery portion (a "C"-portion of the SEM photo) of the electrolyte layer 50 surrounding the circumference of the anode 40, whereas block-like metallic silver was deposited in the electrolyte layer 50 (a "B"-portion of the SEM photo) with which the corner portion of the anode 40 makes contact.

In contrast, no metallic silver deposition was observed in a bonding interface (an "A"-portion of the SEM photo) between the major surface (lower surface) of the anode 40 and the electrolyte layer 50.

In this secondary battery 100, the battery element 10 received within the battery container 70 is sealed off in a state that the packing 80 is interposed between the battery container 70 and the sealing plate 90. During the sealing process, the cathode 30 and the electrolyte layer 50 of the battery element 10 are compressed in the thickness direction thereof and protrude or expand slightly (about 200 μm) toward a gap 100a within the battery container 70, thereby forming a protrusion 50'.

It is found that the branch-like metallic silver is deposited in the protrusion 50', i.e., in the non-compressed portion (the "C"-portion of the SEM photo), and further that the block-like metallic silver is deposited in the lightly compressed portion (the "B"-portion of the SEM photo) of the electrolyte layer 50 at the time of sealing the secondary battery 100. Furthermore, it is turned out that no metallic silver is deposited in the strongly compressed portion of the secondary battery 100 (the "A"-portion of the SEM photo).

The deposition of the branch-like metallic silver or the block-like metallic silver in the electrolyte layer 50 which makes contact with the peripheral portion of the electrode (anode 40) of the battery element 10 means that a quite intensive electric current flows in the peripheral portion when charging the battery.

In other words, when charging the battery, due to the intensive flow of the electric current in the peripheral portion of the electrode, the electrode expands in that portion. This creates gaps (spaces) between the electrode and the electrolyte layer in that portion or gaps between the bonded particles of the electrolyte (hereinafter, these particles of the electrolyte will be referred to as "electrolyte particles") in the electrolyte layer 50 which makes contact with that portion. And the metallic silver is deposited into the gaps.

The deposited metallic silver forms grain boundaries between the electrolyte particles. As a result, this grain boundaries prevent a contact between the electrolyte particles to thereby break the ion-conducting path between the electrolyte particles in the electrolyte layer 50.

Furthermore, the movement of ions in the case of using powdery or granular solid electrolyte (electrolyte particles) is heavily affected by the interface bonding state of electrolyte particles (see N. Aotani, K. Iwamoto, K. Takada and S. Kondo, Solid State Ionics [68 (1994) 35-38]).

In this paper, a change in ion conductivity relative to a molding pressure is measured at the time of making an electrolyte layer from a sulfide-based amorphous lithium ion conductor (electrolyte particles) of different particle sizes. This measurement shows that, if the molding pressure is equal to or greater than 5 tons/cm$^2$, the ion conductivity becomes constant.

It is also reported that, under this state, the ion movement between the electrolyte particles contained in the electrolyte layer is made primarily by bulk conduction instead of grain boundary conduction, thereby eliminating the grain boundary problem which occurs between the electrolyte particles.

Considering this fact together with the test results for the secondary battery 100 made of a silver-ion-conducting solid electrolyte, it can be seen that, during the charge-discharge operations, an electric current flows intensely in the peripheral portion of the electrodes (cathode 30 and anode 40) constituting the battery element 10 at an initial stage.

Expansion and contraction of the volume of electrode active materials become conspicuous in that portion. As a result, an electronic bond between particles (or grains) of the electrode active material or an ion conducting path between the electrode active material and the electrolyte is destroyed mainly in the peripheral portion of the electrode where the interior of the electrode is bonded with a weak mechanical force.

At this time, adhesion between the electrodes and the electrolyte layer is decreased so that gaps (spaces) between them are formed in that portion. As a result, an ion conducting path between the electrodes and the electrolyte layer is also destroyed.

In this regard, the phenomenon that the electric current converges on the peripheral portion of the electrode occurs usually in an electrochemical element, which is referred to as an "edge effect". This phenomenon also appears in the case of using a liquid electrolyte or a polymer electrolyte.

However, since the liquid electrolyte exists in a liquid phase or the polymer electrolyte includes an electrolytic solution, even in the case where the volume of the electrode active material expands and contracts, the liquid electrolyte and the polymer electrolyte can make contact with the electrodes reliably. Therefore, there is no possibility that the ion-conducting path is cut off when the liquid electrolyte and the polymer electrolyte are in use.

Accordingly, it is inferred that the above-noted phenomenon is common to the solid electrolyte secondary battery made of a silver ion conductor and the secondary battery (all-solid secondary battery) employing other kinds of powdery solid electrolyte.

As an example, in the case of an all-solid lithium secondary battery, it is predicted that the electric current flowing during a charge-discharge reaction has a tendency to grow intensive mainly in the peripheral portion of an electrode within the battery.

Based on these facts, it is inferred that the following is the cause of battery capacity reduction over the lapse of charge-discharge cycles in the secondary battery.

First, when charging the battery, the flow of an electric current is concentrated on the peripheral portion of electrodes within the battery. Thus, the volume of an electrode active material, especially an anode active material, is heavily expanded in that portion, whereas a cathode active material undergoes contraction in volume.

Consequently, in the cathode 30 the ion conducting path formed between the electrode active material and the solid electrolyte is disconnected and the electronic bond between the particles of the cathode active material is broken, whereas in the anode 40 the electronic bond between grains of the anode active material is broken.

This weakens the bond (interface bond) between the electrodes (cathode 30 and anode 40) and the electrolyte layer 50 or the bond between electrolyte particles contained in the electrolyte layer 50 that makes contact with the peripheral portion, thereby breaking the bond. Further, metallic silver contained in the electrode active materials or the electrolyte material is deposited between the electrodes and the electrolyte layer 50 or between the electrolyte particles.

The weakening of the bond or the deposition of the metallic silver causes a partial breakage in the ion conducting path between the electrodes and the electrolyte layer 50 or between the electrolyte particles in the electrolyte layer 50. Furthermore, due to the expansion and contraction of the volume of the electrode active materials, an electronic bond between the electrodes and conductive substrates (anode collector 11 and cathode collector 12) may also be destroyed.

This phenomenon grows noticeably in proportion to the intensity of a charging current. It is predicted that the disconnection or the breakage of the electronic bond or the ion conducting path depends on the current supply time, namely the current supply quantity.

Further, in the case where the charge-discharge cycles are repeated, when the battery is charged, the disconnection or the breakage of the electronic bond or the ion conducting path progresses, for a little while, from the peripheral portion side of each electrode (outside the battery element 10) to the central portion side thereof (inside the battery element 10).

On the other hand, when the battery is discharged, only the electrode active material in the portion where the electronic bond remains intact can play a role in the discharge operation. This leads to reduction in discharge capacity as compared to the charge capacity.

Further, during the discharging process, the volume of the anode active material contracts, whereas the volume of the cathode active expands unlike during the charging process. As a result, during the discharging process, the electronic bond and ion conducting path are also broken or disconnected in the same manner as during the charging process.

In the case of recharging this battery, the charge quantity of electricity becomes equal to the electricity quantity corresponding to the discharge capacity from which the electric capacity used in breaking the electronic bond and disconnecting the ion-conducting path during the charging process mainly at the side of the anode 40 is deducted. At this time, the electricity is recharged while breaking the electronic bond or disconnecting the ion-conducting path once again.

Further, in the case where the battery is discharged again, only the electrode active material in the portion where the electronic bond or the ion-conducting path remains intact can play a role in the discharge operation. This means that the discharge capacity is further reduced as compared to the charge capacity.

In other words, at least one of the electronic bond and the ion-conducting path of the battery is broken or disconnected each time the battery undergoes the charge-discharge operations. In accordance with this, the discharge capacity is reduced for a little while.

In view of the foregoing study, the present inventor has reached a conclusion that, for avoidance of reduction in battery capacity caused by the lapse of charge-discharge cycles, it is important to maintain the state of electrodes (electrode layers) so as to be close to an initial state. Based on this conclusion, the present inventor has completed the invention.

The task of maintaining the state so as to be close to the initial state can be accomplished by restricting expansion and contraction of the electrodes. Further, the above task can be accomplished by eventually preventing any breakage of the electronic bond and any disconnection of the ion-conducting path in the peripheral portion of the electrodes, any disconnection of the ion-conducting path between the electrodes and the electrolyte layer, and any disconnection of the ion-conducting path between electrolyte particles in the peripheral portion of the electrolyte layer 5.

A secondary battery in accordance with the invention includes a first electrode layer, a second electrode layer, and an electrolyte layer provided between the first and second electrode layers, wherein the electrolyte layer is composed of (includes) electrolyte particles.

In the secondary battery of the invention, at least one of the first and second electrode layers is formed from a base member having a plurality of concave portions and an electrode material filled into at least the concave portions, or a base member having a plurality of convex portions and an electrode material provided so as to cover the convex portions.

Since the base member does not endow a battery reaction, that is, a constituent material of the base member does not ionize, the base member itself does not expand and contract substantially during charge-discharge operations. Further, since the base member has the concave portions or the convex portions, the electrode material can be positioned within the electrode layer by the concave portions or the convex portions.

Due to these reasons, the above mentioned expansion and contraction of the electrode layer containing the base member is prevented when the secondary battery is in use. As a result, the secondary battery can avoid reduction in battery capacity over the lapse of charge-discharge cycles and can exhibit high performance.

Hereinafter, the secondary battery (all-solid secondary battery) in accordance with the invention will be described in detail with reference to preferred embodiments shown in the drawings.

In the following embodiments, a silver-ion-conducting secondary battery will be representatively set forth as an example of the secondary battery (all-solid secondary battery) in accordance with the invention.

First Embodiment

First, description will be made on a first embodiment of the secondary battery.

Figure 1:
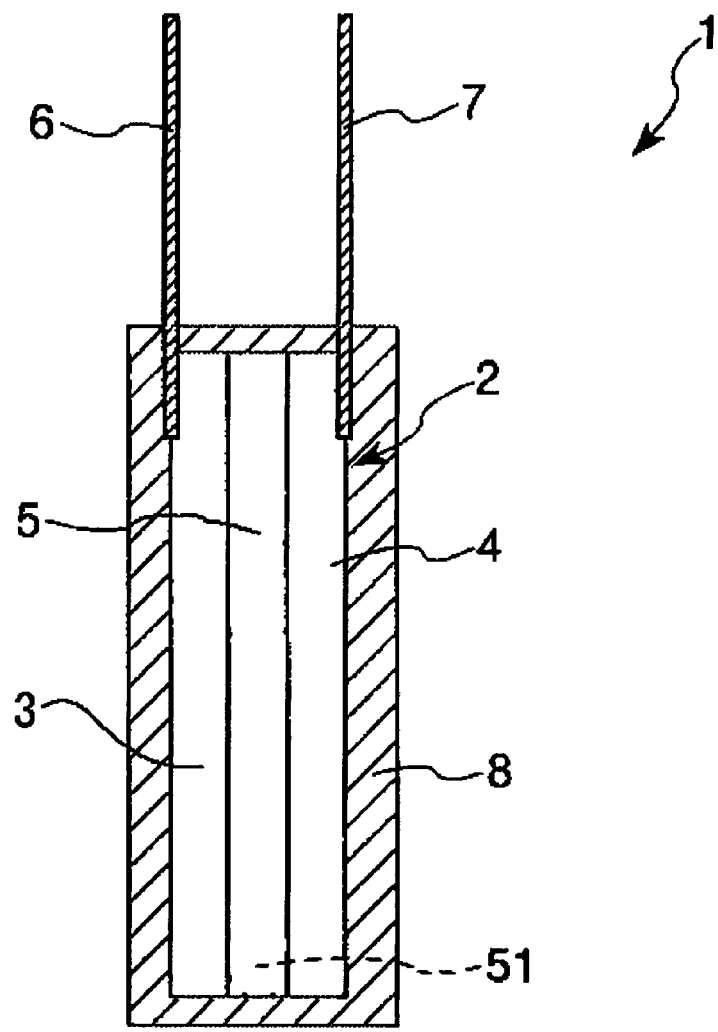
FIG. 1 is a partial vertical section view showing a secondary battery in accordance with a first embodiment of the invention.
Figure 2:
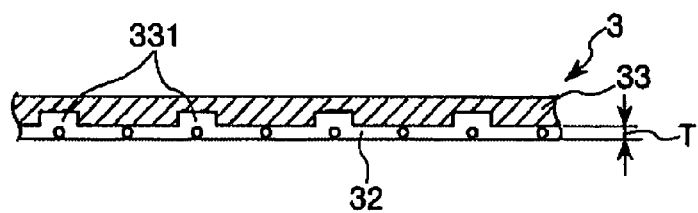
FIG. 2 is a vertical section view showing a configuration example of an electrode of the secondary battery.

FIG. 1 is a partial vertical section view showing a secondary battery in accordance with a first embodiment of the invention. FIG. 2 is a section view showing a configuration example of an electrode of the secondary battery.

In the following description, the upper side in FIG. 2 will be referred to as "top" or "upper" and the lower side will be referred to as "bottom" or "lower", only for the sake of better understanding. Further, it is assumed that an electrolyte layer lies below the electrode in FIG. 2.

Referring to FIG. 1, the secondary battery (secondary battery with a restrictor) 1 includes a laminated body (battery element) 2, a cathode lead 6, an anode lead 7 and a restrictor 8 provided so as to cover substantially the entirety (entire circumference) of the laminated body 2, wherein the laminated body 2 is provided with a cathode (first electrode layer) 3 and an anode (second electrode layer) 4 (i.e., a pair of electrodes) as well as an electrolyte layer 5 provided between the cathode 3 and the anode 4.

The cathode 3 shown in FIG. 1 has the configuration shown in FIG. 2. Namely, as will be described later in details, the cathode 3 includes a base member 33 having a major surface on which a plurality of concave portions 331 are formed and an electrode material 32 filled in at least the concave portions 331. Further, the major surface of the base member 33 faces to the electrolyte layer 5, that is, the cathode 3 is provided so that the concave portions 331 of the base member (plate member) 33 is positioned at the side of the electrolyte layer 5.

In this regard, it is to be noted that in this embodiment, the anode 4 has the same configuration as that of the cathode 3 and is provided in the same manner as the cathode 3.

First, description will be given on the cathode 3 and the anode 4. Seeing that the cathode 3 and the anode 4 have the same configuration in the present embodiment, the cathode 3 will be described as a representative.

As illustrated in FIG. 2 and as described above, the cathode 3 is comprised of the base member 33 and the electrode material (electrode layer material) 32. The base member 33 has a major surface facing to the electrolyte layer 5. The concave portions 331 which serve as filling portions are formed on the major surface. In this regard, when seen in a plan view, the base member 33 has a contour and size nearly equal to that of the electrolyte layer 5. Further, in this embodiment, the electrode material 32 is provided on the major surface of the base member 33 so that the concave portions 331 are filled therewith.

The base member 33 is provided for realizing: i) a function of preventing or suppressing expansion of the electrode (cathode 3) in the plane direction thereof; and ii) a function of making the current density in the cathode 3 (electrode) uniform by providing conductivity to at least the circumference surface of the base member 33. The base member 33 may be provided so as to play other functions.

In this regard, it is to be noted that the base member 33 may have a plurality of convex portions at regions corresponding to the concave portions. The base member 33 having this configuration also can exhibit the function of preventing or suppressing expansion of the electrode (electrode material) in the plane direction thereof. In this case, the shapes and arrangement of the convex portions can be set so as to be the same as those of the concave portions 331 described below.

In the case of the function i), the laminated body 2 is produced by performing a press operation in a state that the electrolyte particles 51 constituting the electrolyte layer 5 are interposed between the cathode 3 and the anode 4. This makes it possible to suppress or prevent occurrence of elongation (deformation) in the cathode 3 (electrode) when producing the laminated body 2.

This ensures that the electrolyte layer 5 provided between the cathode 3 and the anode 4 in a contacting relationship therewith can also be formed with no likelihood of deformation. It becomes also possible to increase the mechanical strength of the secondary battery 1 as a whole.

Furthermore, in the case of the function i), it is possible for the base member 33 to restrict expansion of the electrode material 32 filled in the respective concave portions 331, which would otherwise occur by the expansion and contraction of crystals of the electrode material 32 when the secondary battery 1 is in use (charge-discharge operation).

This makes it possible to reduce the expansion of the cathode 3 (electrode) as a whole. Therefore, in the interface between the cathode 3 and the electrolyte layer 5, it is possible to suitably suppress or prevent an increase in contact resistance which would be caused by disconnection (disjunction) of the cathode 3 and the electrolyte layer 5.

In the case of the function ii), the current density in the cathode 3 (electrode) becomes uniform when the secondary battery 1 is charged and discharged. This suppresses or prevents emergence of a region where the electric current flows locally (e.g., the electric current flows preferentially around a portion of cathode 3 to which the cathode lead 6 is connected) and, consequently, local expansion or contraction of an electrode active material in that region.

In this regard, attention is drawn to the fact that the deposition and dissolution phenomenon of, e.g., a metal (silver), is accompanied by a severe change in volume. Therefore, it is possible to suitably suppress or prevent degradation of charge-discharge characteristics of the secondary battery 1.

Examples of a constituent material of the base member 33 include an insulating material, a dielectric material and a conductive material, although the constituent material of the base member 33 is not limited thereto. The constituent material of the base member 33 is selected from the above materials depending on the intended use and demanded function of the base member 33.

For example, in the case of the function i), examples of the constituent material that can be used as the base member 33 include: electron-conducting metallic materials such as copper (Cu), nickel (Ni), titanium (Ti) and stainless steel (SUS); and insulating materials inclusive of a hard resin material such as polycarbonate and ceramics such as alumina and glass.

In the case of the function ii), examples of the base member 33 include a member having conductivity at least on its circumference surface, such as a member made of a conductive material in its entirety or a member having a core whose circumference surface is coated with a conductive layer.

Examples of a method for forming the conductive layer include a gas phase coating method such as vapor deposition or sputtering and a liquid phase coating method such as electrolytic plating or non-electrolytic plating, one or more of which may be used independently or in combination.

In this regard, it is to be noted that in order to endow the base member 33 with both of the function i) and the function ii), it is desirable to use a member made of a conductive material in its entirety. As described above, the cathode 3 shown in FIG. 2 includes the base member 33 having the concave portions 331 which serve as filling portions, and the electrode material 32 is filled in at least the concave portions 331 of the base member 33.

In the base member 33 having such a configuration, the occupation percentage of the concave portions 331 of the base member 33 in a plan view is preferably about 25 to 85% and more preferably about 35 to 75%, although it may slightly vary depending on the constituent material and intended use of the base member 33.

Furthermore, the average depth of the concave portions 331 of the base member 33 is preferably about 50 to 400 μm and more preferably about 100 to 200 μm, although the average depth may be slightly changed depending on the constituent material and intended use of the base member 33.

In the configuration shown in FIG. 2, the concave portions 331 of the base member 33 are composed of linear or curved grooves each extending along a direction normal to the surface of the paper sheet. Further, the grooves may intersect to each other (e.g. in a lattice manner). Furthermore, the concave portions 331 may be formed from a number of depressions on the major surface of the base member 33.

These concave portions 331 can be formed by performing various kinds of methods such as a dry etching method, a wet etching method, a sandblast treatment, a shotblast treatment, a plating method and a laser beam machining to a raw material of the base member 33.

As shown in FIG. 11, the concave portions 331 may be formed so that the base member 33 has a honeycomb structure. This makes it possible to improve the above mentioned function i) of the base member 33. Further, the concave portions 331 may be formed so that the base member 33 has a pinholder-shaped structure. This makes it possible to fill a large amount of the electrode material 32 in the concave portions 331. Furthermore, The base member 33 may have other structures.

In the present embodiment, the electrode material 32 is applied to the base member 33 in such a manner that the concave portions 331 of the base member 33 are filled with the electrode material 32 and also can cover substantially the whole major surface of the base member 33.

The electrode material 32 is applied on the base member 33 as described later. Alternatively, the electrode material 32 may be applied onto the major surface of the base member 33, on which the concave portions 331 are formed, as a liquid material in which the electrode material 32 is dispersed in a dispersion medium. This makes it possible to form the cathode 3 having a smooth surface, while enabling the electrode material 32 to be filled in the concave portions 331 reliably.

As an application method, a screen printing can be preferably used. By applying the electrode material 32 using the screen printing, the average thickness of an electrode layer formed of the electrode material 32 can be adjusted to 50 nm or less. Therefore, in the case where the base member 33 has the average thickness of 30 nm, the average thickness of the formed cathode 3 (electrode layer) can be adjusted 80 nm or less.

As the electrode material 32, an electrode active material or a mixture of an electrode active material and a solid electrolyte material (an electrode mixture material) may be used.

By using the mixture of the electrode active material and the solid electrolyte material as the electrode material 32, it becomes possible to increase the ion-conducting bonding interface between particles of the electrode active material and the electrolyte particles which constitute the cathode 3 (electrode), and also to increase the interface bonding force (adhesion) between the cathode 3 and the electrolyte layer 5.

This ensures that ions are smoothly transferred between the electrodes and the electrolyte layer 5, which makes it possible to improve the characteristics (charge-discharge characteristics) of the secondary battery 1.

Examples of the electrode active material include δ-type silver vanadate (δ-$Ag_{0.7}V_2O_5$), metallic silver (Ag) and silver chromate ($Ag_2Cr_2O_4$), one or more of which may be used independently or in combination. Among them, it is desirable to use δ-type silver vanadate (particularly, δ-$Ag_{0.7}V_2O_5$) as the electrode active material.

Use of this compound makes it possible to improve the characteristics of the cathode 3 and the anode 4 and, eventually, to enhance the characteristics (charge-discharge characteristics) of the secondary battery 1. Moreover, δ-type silver vanadate is less environmentally detrimental, more stable in the air and easier to handle than silver chromate.

In the case of using the mixture of the electrode active material and the solid electrolyte material, the solid electrolyte material may either be the same kind as (identical to) or differ from the constituent material of the electrolyte layer 5 (electrolyte material) set forth below.

However, it is preferred that the solid electrolyte material is the same kind as (especially, identical to) the constituent material of the electrolyte layer 5. This assures smooth transfer of metal ions (silver ions) between the cathode 3 (electrode) and the electrolyte layer 5 and also helps to improve adhesion between them.

In this case, the mixing ratio of the electrode active material (conductive material) and the solid electrolyte material is preferably about 2:8 to 8:2 by weight and more preferably about 3:7 to 7:3 by weight, although the mixing ratio is not particularly limited thereto.

As the electrode material 32, it is desirable to use a granular (powdery) material having a particle size of 20 micron or less. Use of such as granular electrode material 32 makes it possible to fill the electrode material 32 in the concave portions 331 of the base member 33 in an easy and reliable manner.

In a side view, the cathode 3 has a portion where the electrode material 32 does not overlap the base member 33 at the side of the electrolyte layer 5, namely an electrode material layer extending from the base member 33 toward the electrolyte layer 5 (exposed to the electrolyte layer 5) and made of the electrode material 32 (solely constructed from the electrode material 32).

The average thickness of the electrode material layer (length "T" in FIG. 2) is preferably 120 μm or less, more preferably 100 μm or less, and even more preferably 80 μm or less. If the average thickness of the portion of the electrode material 32 that does not overlap the base member 33 is set to fall within the above range, the effect of the base member 33 provided in the cathode 3 becomes conspicuous. A lower limit of the average thickness is not particularly limited but may be preferably about 5 μm.

The electrolyte layer 5 is provided between the cathode 3 and the anode 4 to make contact with them. During the charge-discharge operations of the secondary battery 1, ions (metal ions) are moved through the electrolyte layer 5.

In the invention, the electrolyte layer 5 is formed by compression-molding electrolyte particles 51. The electrolyte particles 51 are preferably composed of a silver ion conductor or a mixture containing the silver ion conductor (an ion conductor mixture). Examples of the mixture include a mixture of the silver ion conductor and a lithium ion conductor described below.

Examples of the silver ion conductor include $Ag_6I_4WO_4$, $AgI$, $Ag_4RbI_5$, $Ag_3SI$, $Ag_2S$, one or more of which may be used independently or in combination. Among them, it is preferred that iodinated silver tungstate ($Ag_6I_4WO_4$) exhibiting good thermal stability is used as the silver ion conductor.

Use of this compound makes it possible to improve the performance of the electrolyte layer 5 and, eventually, the characteristics (charge-discharge characteristics) of the secondary battery 1. Furthermore, iodinated silver tungstate is stable in the air and easy to handle.

The average particle size of the electrolyte particles 51 is not particularly limited but may be preferably about 0.1 to 10 μm and more preferably about 1 to 5 μm. Use of the electrolyte particles 51 having such particle size makes it possible to improve the mutual contact of the electrolyte particles 51 in the electrolyte layer 5, and also to increase the bonding area between the electrode active material (particles of the electrode active material) and the electrolyte particles in the electrodes. Consequently, it becomes possible to sufficiently secure transfer paths of the silver ions (metal ions), thereby further improving the characteristics of the secondary battery 1.

Moreover, the average thickness of the electrolyte layer 5 is preferably about 50 to 300 μm and more preferably about 75 to 200 μm.

The laminated body 2 is constructed from the electrolyte layer 5, the cathode 3 and the anode 4, the cathode 3 and the anode 4 respectively bonded to the surfaces of the electrolyte layer 5. In this regard, it is to be noted that one or more layer having an arbitrary purpose may be provided between the cathode 3 and the electrolyte layer 5, between the anode 4 and the electrolyte layer 5, or the like.

Furthermore, the cathode lead 6 and the anode lead 7 exhibiting electrical conductivity are respectively connected to the cathode 3 and the anode 4 and serve as lead lines (conductive portions) through which electricity is charged to or discharged from the secondary battery 1.

Almost all of the laminated body 2 excepting the cathode lead 6 and the anode lead 7 is covered with the restrictor 8, thus allowing the cathode lead 6 and the anode lead 7 to be exposed to the outside.

The restrictor 8 serves mainly to restrict expansion of the cathode (electrode layer) 3 in the plane direction thereof (in a direction generally perpendicular to the direction crossing the cathode 3 and the anode 4, i.e., a vertical direction in FIG. 1) and the resultant expansion of the electrolyte layer 5 in the plane direction thereof.

In the secondary battery 1, the crystal structures of the electrode active material are three-dimensionally deformed (expanded or contracted) in response to the charge-discharge operations.

In a hypothetical case that the secondary battery is not provided with the restrictor 8 and the base member 33, the cathode 3 and the anode 4 are heavily deformed (expanded or contracted) in the plane direction thereof but not in the thickness direction thereof as the crystal structures of the electrode active material are three-dimensionally deformed or changed.

As a result, especially in the peripheral portion of the cathode 3 and the anode 4, a bond inhibition phenomenon that breaks or disconnects the above-mentioned electronic bond or ion-conducting path is created. This makes it difficult for an electric current to flow through the peripheral portions of the cathode 3 and the anode 4 when charging or discharging the secondary battery.

Further, at this time, the electrolyte layer 5 is also deformed (expanded or contracted) in the plane direction thereof due to the expansion or contraction of the cathode 3 and the anode 4 in the plane direction thereof, thereby forming a portion that protrudes from the cathode 3 and the anode 4. As mentioned earlier, in the protruding portion the ion-conducting path is broken.

This phenomenon proceeds gradually as the secondary battery is repeatedly charged and discharged. As a consequence, the battery capacity of the secondary battery is gradually reduced, making it difficult to charge and discharge the secondary battery.

In contrast, the secondary battery 1 of this embodiment is configured to have the restrictor 8 and the base member 33 that serve to restrict expansion of the cathode (electrode layer) 3 in the plane direction thereof (the vertical direction in FIG. 1) and the resultant expansion of the electrolyte layer 5 in the plane direction thereof. Thus, the secondary battery 1 can be kept in a shape as close to the initial shape as possible when manufacturing the secondary battery 1 and charging and discharging the same.

That is to say, the afore-mentioned problem can be avoided by restricting expansion of the cathode (electrode layer) 3 and the electrolyte layer 5 in the plane direction thereof. As a result, it becomes possible to avoid battery capacity reduction which would otherwise occur over the lapse of charge-discharge cycles (by the multiple times of charge-discharge operations).

The restrictor 8 is preferably made of an insulating material. This helps to reliably prevent short-circuit between the cathode 3 and the anode 4. Alternatively, the restrictor 8 may be made of a conductive material (a metallic material or the like), in which case it is desirable to interpose an insulating layer (an insulating sheet) between the laminated body 2 and the restrictor 8.

Examples of the insulating material include various kinds of resin materials such as thermoplastic resin, thermosetting resin and photocurable resin, various kinds of glass materials and various kinds of ceramics materials.

Among these materials, it is desirable that the insulating material is mainly any one of thermoplastic resin, thermosetting resin, photocurable resin and low-melting-point glass or a combination of two or more of them. Use of these materials allows the restrictor 8 to be formed with ease. Furthermore, use of these materials helps to increase the mechanical strength of the restrictor 8.

Examples of the thermoplastic resin include polyolefin, ethylene-vinyl acetate copolymer, polyamide, polyimide and hot-melt resin. Examples of the thermosetting resin include epoxy-based resin, polyurethane-based resin and phenol-based resin.

Further, examples of the photocurable resin include epoxy-based resin, urethane acrylate-based resin and vinyl ether-based resin. Examples of the low-melting-point glass include $P_2O_5$—CuO—ZnO-based low-melting-point glass, $P_2O_5$—SnO-based low-melting-point glass and $B_2O_3$—ZnO—$Bi_2O_3$-$Al_2O_3$-based low-melting-point glass.

The average thickness of the restrictor 8 (particularly, the average thickness of a side surface thereof) is preferably about 50 to 300 μm and more preferably about 100 to 200 μm, although it may be slightly changed depending on the constituent material and intended use of the restrictor 8. By setting the average thickness within this range, it is possible to reliably prevent expansion of the cathode (electrode layer) 3 and the electrolyte layer 5 in the plane direction thereof, thereby allowing the restrictor 8 to play its role in a reliable manner.

For example, the secondary battery 1 described above can be manufactured through the following steps.

Figure 3:
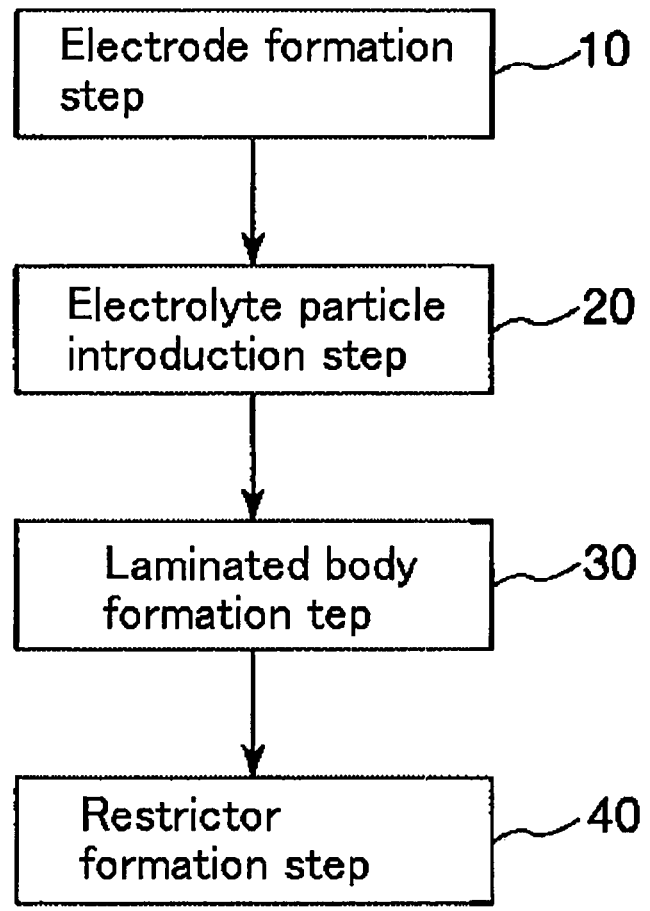
FIG. 3 is a flowchart illustrating a method for manufacturing the secondary battery in accordance with the invention.

FIG. 3 is a flowchart illustrating a method for manufacturing the secondary battery in accordance with the invention.

Referring to FIG. 3, a method for manufacturing the secondary battery in accordance with the invention includes an electrode formation step 10 of forming electrodes within a mold, an electrolyte particle introduction step 20 of introducing the electrolyte particles 51 onto the cathode 3, a laminated body formation step 30 of forming the laminated body 2 by pressing the interior of the mold, and a restrictor formation step 40 of forming the restrictor 8 so as to cover all of the laminated body 2.

Hereinafter, the respective steps will be described one by one.

<A> Electrode Formation Step (First Step) 10

First, a female mold 500 having a cylindrical hole as shown in FIG. 7 is prepared. Subsequently, the base member 33 is inserted into the cylindrical hole of the female mold 500 in a state that a lower male mold 400 has been inserted into the cylindrical hole.

In this process, the base member 33 is inserted into the cylindrical hole in such a manner that the concave portions 331 of the base member 33 are faced upwardly (that is, in such a manner that the major surface of the base member 33 is faced upwardly). Thereafter, the electrode material 32 is filled in the cylindrical hole of the female mold 500 so that a layer (electrode material layer) composed of the electrode material 32 is formed onto the major surface of the base member 33.

In this regard, it is to be noted that the molds are not limited to the metallic ones. It is needless to say that the molds may be made of, e.g., resin or ceramics.

And then, an upper male mold 600 is inserted into the cylindrical hole and press-forming is performed at a predetermined pressure. As a result, the electrode material layer is pressed against the major surface of the base member 33 and the electrode material 32 is compressed and filled into the concave portions 331 of the base member 33 to thereby form the cathode 3.

In this regard, the press-forming pressure is preferably equal to or greater $0.5 \text{ ton/cm}^2$ and more preferably equal to or greater than $2 \text{ tons/cm}^2$. This makes it possible to suitably compress the electrode material 32 and also to fill the electrode material 32 in the concave portions 331 of the base member 33.

Prior to forming the cathode 3, the anode 4 can be formed by performing the same step as the one described just above and taking out the anode 4 from the cylindrical hole.

<B> Electrolyte Particle Introduction Step (Second Step) 20

Next, after removal of the upper male mold 600 from the cylindrical hole, the electrolyte particles (solid electrolyte particles) 51 are filled into the cylindrical hole without having to remove the cathode 3 therefrom so that the electrolyte particles 51 are placed onto the cathode 3. Thereafter, the anode 4 produced in advance is placed onto the electrolyte particles 51. If needed, a mold release agent may be applied to an inner surface of the cylindrical hole.

<C> Laminated Body Formation Step (Third Step) 30

Next, the upper male mold 600 that has been removed is set to the female mold 500 again and is pushed down so that the cathode 3 and the anode 4 (a pair of electrodes) can be pressed against and bonded to the electrolyte layer within the female mold 500. This produces the laminated body 2 in which the electrolyte layer 5 is interposed between the cathode 3 and the anode 4 in a bulk state.

The pressure applied at this time is preferably equal to or greater than $2 \text{ tons/cm}^2$, and more preferably equal to or greater than $3 \text{ tons/cm}^2$. This ensures that the laminated body 2 is sufficiently compressed.

As a result, it is possible to avoid the above-mentioned formation of the gaps (spaces) between the electrolyte particles 51 or between the electrodes and the electrolyte layer 5 and deposition of metallic silver contained in the electrode active materials or electrolyte material into the gaps during the charge-discharge operations, that is, the above-mentioned formation of the grain boundaries composed of the metallic silver between the electrolyte particles 51 in the electrolyte layer 5 or between the electrodes and the electrolyte layer 5 when the secondary battery 1 is in use. Thus, it is possible to improve the characteristics of the secondary battery 1 obtained.

Due to the fact that the cathode 3 and the anode 4 are provided with the base member 33, it becomes possible to surely prevent deformation of the cathode 3 and the anode 4, thereby avoiding deformation of the electrolyte layer 5 in a reliable manner.

<D> Restrictor Formation Step (Fourth Step) 40

Next, the pressure applied in the laminated body formation step <C> is released and the thus formed laminated body 2 is removed or separated from the female mold 500, and then almost all of the laminated body 2 is covered with the restrictor 8.

In the case where the restrictor 8 is made of, e.g., hot-melt resin (a hot-melt adhesive agent) or low-melting-point glass, it is possible to form the restrictor 8 by melting or softening the hot-melt resin or the low-melting-point glass, supplying the same on the outer circumferential surface of the laminated body 2 and allowing the same to be cooled down and solidified. This method ensures that the restrictor 8 is reliably formed so as to cover almost all of the laminated body 2.

Various kinds of methods can be used to supply the hot-melt resin or the low-melting-point glass in a melt or softened state (liquid state) to the outer circumferential surface of the laminated body 2.

Examples of these methods include: i) a method of dipping the laminated body 2 into the hot-melt resin or the low-melting-point glass in a liquid state (a dipping method); ii) a method of coating the hot-melt resin or the low-melting-point glass in a liquid state on the outer circumferential surface of the laminated body 2 (a coating method); and iii) a method of injecting liquid resin, by a vacuum encapsulation method (a degassing method), into a battery container 9 that accommodates the laminated body 2 and remains closed by a lid 92 having a resin injection port, the cathode lead 6 and the anode lead 7 extending through insulation tubes 93 secured to the lid 92, and then solidifying the resin to seal off the resin injection port.

Figure 4:
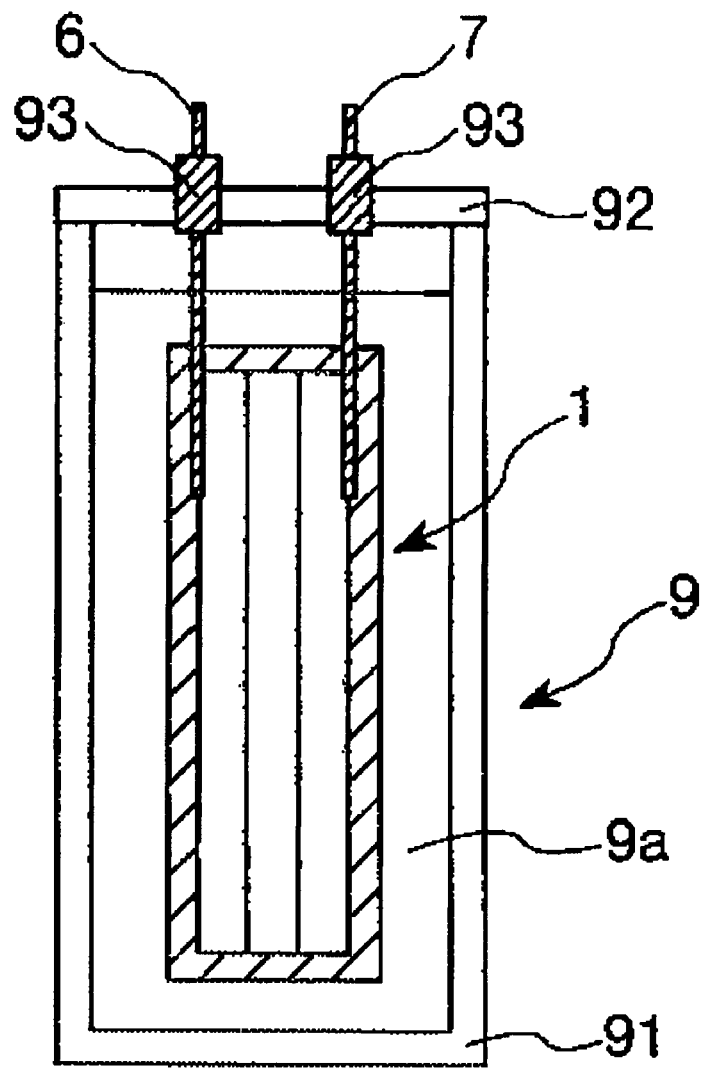
FIG. 4 is a partial vertical section view showing a secondary battery in accordance with a second embodiment of the invention.

In this regard, it is to be noted that the method iii) is illustrated in FIG. 4 and will be described later in detail.

Further, in the case where the restrictor 8 is made of, e.g., thermosetting resin or photocurable resin, it is possible to form the restrictor 8 by supplying an uncured resin material in a liquid state to the outer circumferential surface of the laminated body 2 and solidifying the same through heating or light irradiation. Use of this method also makes it possible to reliably form the restrictor 8 so that it can cover substantially the entirety of the laminated body 2.

Furthermore, by forming the restrictor 8 by means of the vacuum encapsulation method, it is possible to prevent or suppress an air bubble (space) from generating within the restrictor 8. This makes it possible to improve the mechanical strength of the restrictor 8. As a result, it is possible to restrict the expansion of the electrolyte layer 5 and the electrodes 3 and 4 in the plane direction thereof reliably. Therefore, a secondary battery which can prevent reduction of a battery capacity over the lapse of charge-discharge cycles reliably can be obtained.

The above-noted methods for supplying the hot-melt resin or the low-melting-point glass in a liquid state can be equally used in supplying the uncured resin material to the outer circumferential surface of the laminated body 2.

Preferably, the present step is started immediately after releasing the pressure at the end of the laminated body formation step <C>. In other words, the restrictor 8 should preferably be formed before the laminated body 2 restores its original thickness after release of the pressure applied thereto. By doing so, the restrictor 8 can be formed so as to cover the entirety of the laminated body 2 in a state that the laminated body 2 is possibly kept in the pressed shape.

This makes it possible to reliably manufacture the secondary battery 1 in which the overall shape of the laminated body 2 is kept as close to the initial shape as possible. This suppresses or prevents the formation of the grain boundaries composed of the metallic silver in the electrolyte layer 5 or between the electrodes and the electrolyte layer 5 during the charge-discharge operations.

More specifically, when the average thickness of the laminated body 2 immediately after press-forming and removing the same from the mold is defined as A (μm) and the average thickness of the laminated body 2 immediately before the step of forming the restrictor 8 over the laminated body 2 is defined as B (μm), the relationship B/A is preferably equal to or less than 1.20 and more preferably about 1.00 to 1.05. This helps to provide the afore-mentioned effect in a more reliable manner.

In this regard, it is to be noted that the restrictor 8 may be formed so as to cover the end portion of the laminated body 2 in a state that the laminated body 2 is removed from the female mold 500 while maintaining the pressure applied to the laminated body 2 by the lower male mold 400 and the upper male mold 600, that is, before releasing the pressure at the end of the laminated body formation step <C>. In this modification, the female mold 500 is formed into a type that can be separated into two or more pieces for removal from the laminated body 2.

In the case where the present step is started after release of the pressure applied to the laminated body 2, the time taken from the pressure release to initiation of the present step is preferably equal to or shorter than 300 minutes, more preferably equal to or shorter than 60 minutes, and even more preferably about 1 to 60 minutes, although it may somewhat vary with the kinds of the electrolyte materials used.

By starting the present step within the time noted above, it becomes possible to suppress or prevent thickness restoration of the laminated body 2 when the latter is released from the pressurized state. This makes it possible to suitably suppress or prevent reduction in battery capacity.

The secondary battery 1 can be manufactured through the steps described above.

The restrictor 8 is not limited to the monolayer structure set forth above in respect of the present embodiment but may be of, e.g., a laminated structure (multilayer structure) having two or more insulating layers made of the above-noted insulating materials. The restrictor 8 of such a structure can be formed by performing the step <D> several times.

Although the restrictor 8 employed in the present embodiment is of the type covering almost all of the laminated body 2, it is sufficient that the restrictor 8 is provided so as to partially cover four side surfaces (end portion) of the laminated body 2.

Use of the restrictor 8 of such a configuration also makes it possible to sufficiently restrict expansion of the electrolyte layer 5 in the plane direction thereof.

However, it should be understood that, in the case where the restrictor 8 is formed so as to cover almost all of the laminated body 2, the function of restricting expansion of the electrolyte layer 5 in the plane direction thereof is played noticeably. By doing so, it is also possible to secure the mechanical strength of the secondary battery 1 as a whole and to allow the restrictor 8 to serve as a protection layer for the laminated body 2.

Second Embodiment

Next, description will be made on a secondary battery in accordance with a second embodiment of the invention.

FIG. 4 is a partial vertical section view showing a secondary battery in accordance with a second embodiment of the invention.

In the following description, the upper side in FIG. 4 will be referred to as "top" or "upper" and the lower side will be referred to as "bottom" or "lower", only for the sake of better understanding.

Hereinafter, the second embodiment will be described with emphasis placed on the points differing from the first embodiment. No description will be given on the same points as in the first embodiment.

In the second embodiment, the secondary battery 1 mentioned in the first embodiment is received in a battery container 9 and secured in place by means of a fixing member 9a.

By accommodating the secondary battery 1 within the battery container 9, it is possible to reliably restrict expansion of the electrode layers (cathode 3 and anode 4) and the electrolyte layer 5 in the plane direction thereof. In this sense, the battery container 9 and the fixing member 9a may be considered to constitute parts of the restrictor 8.

Such a battery configuration helps to prevent infiltration of external moisture into the secondary battery 1 and can be suitably employed in constructing an all-solid secondary battery (particularly, a lithium-ion-conducting secondary battery set forth later).

The battery container 9 includes a container body 91 of a bottom-closed hollow cylindrical shape and a lid 92 for closing a top opening of the container body 91: The cathode lead 6 and the anode lead 7 are inserted through the lid 92 and fixed or attached to the lid 92 by way of insulation members (insulation tubes) 93 so that they can be kept free from short-circuit.

Examples of a constituent material of the battery container 9 (the container body 91 and the lid 92) include various kinds of metallic materials such as aluminium, copper, brass and stainless steel, various kinds of resin materials, various kinds of ceramics materials, various kinds of glass materials, and various kinds of composite materials consisting of metal and resin.

The secondary battery 1 with the battery container 9 noted above is manufactured by, e.g., filling curable resin of an uncured state such as thermosetting resin or photocurable resin in the container body 91, placing the secondary battery 1 into the container body 91 and then curing the curable resin so that it can serve as the fixing member 9a. In place of the curable resin, the thermoplastic resin or the low-melting-point glass mentioned earlier may be used as the fixing member 9a.

In this regard, in the case where the laminated body 2 covered with the restrictor 8 has a shape corresponding to the internal dimension of the container body 91, the fixing member 9a may be omitted.

While the silver-ion-conducting secondary battery has been described in the above embodiments as an example of the secondary battery in accordance with the invention, the present secondary battery can be equally applied to various kinds of ion-conducting secondary batteries, including a lithium-ion-conducting secondary battery.

In the case where the present secondary battery is applied to the lithium-ion-conducting secondary battery, it is possible to use the below-listed materials as an electrode active material contained in the constituent material of the cathode 3 and the anode 4.

More specifically, examples of the cathode active material include: transition metal oxide materials such as lithium cobaltate ($Li_xCoO_2$), lithium nickelate ($Li_xNiO_2$), lithium nickel cobaltate ($LiCu_{0.3}Ni_{0.7}O_2$), lithium manganate ($LiMn_2O_4$), lithium titanate ($Li_{4/3}Ti_{5/3}O_4$), lithium manganate compound ($LiM_yMn_{2-y}O_4$, where the M is Cr, Co or Ni), lithium iron phosphate and olivine compound, which is one kind of lithium iron phosphate compound ($Li_{1-x}FePO_4$ and $Li_{1-x}Fe_{0.5}Mn_{0.5}PO_4$); sulfide-based chalcogen compound such as $TiS_2$, $VS_2$, FeS and $M.MoS_8$ (where the M is transition metal such as Li, Ti, Cu, Sb, Sn, Pb and Ni); and lithium metal oxide containing metal oxide as its skeleton, such as $TiO_2$, $Cr_3O_8$, $V_2O_5$, $MnO_2$ and $CoO_2$, one or more of which may be used independently or in combination.

On the other hand, examples of the anode active material include metallic materials, such as lithium, indium, aluminum, tin, bismuth and lead, and oxide of these metallic materials, one or more of which may be used independently or in combination or in the form of alloy.

The cathode active material and the anode active material are not particularly limited to the ones noted above. There is no problem if a material exhibiting electropositive potential against the anode active material is selected as the cathode active material through the combination of the afore-mentioned materials. By adopting such a configuration, it is possible to provide the secondary battery 1 having an arbitrary discharge voltage.

Furthermore, it is preferred that a lithium ion conductor or an electron-ion conducting material (e.g., the electrode active material) is independently used as the solid electrolyte material mixed into the electrode material.

Examples of the lithium ion conductor include: a sulfide-based (amorphous) lithium ion conductor containing lithium sulfide ($Li_2S$), silicon sulfide ($SiS_2$) and lithium phosphate ($LiPO_4$); a sulfide-based (amorphous) lithium ion conductor containing phosphorus sulfide ($P_2S_5$) and lithium sulfide ($Li_2S$); and crystalline lithium ion conductors such as $Li_{3.25}Ge_{0.25}P_{0.75}S_4$, $Li_{1.3}Al_{0.3}Ti_{1.7}(PO_4)_3$ and $Li_{3.6}Ge_{0.6}V_{0.4}O_4$, one or more of which may be used independently or in combination.

Among them, it is preferred that the sulfide-based lithium ion conductors exhibiting good ion conductivity is used as the lithium ion conductor. By manufacturing the secondary battery 1 using the sulfide-based lithium ion conductors as the solid electrolyte material, it is possible to improve the characteristics of the secondary battery 1.

Furthermore, it is preferred that the sulfide-based lithium ion conductors contain at least one of a crystalline lithium ion conductor and an amorphous lithium ion conductor. The crystalline lithium ion conductor is a material that endows the electrolyte with the most superior lithium ion conductivity and exhibits good moldability. Therefore, use of the crystalline lithium ion conductor in manufacturing the secondary battery 1 provides an advantage that the output current density can be kept high.

On the other hand, the amorphous lithium ion conductor does not give anisotropic conductivity to the material made therefrom, exhibits high heat stability and has a softening temperature. Therefore, use of the amorphous lithium ion conductor makes it possible to form the electrodes while heating the ion conductor up to its softening temperature. This helps to maintain the ion-conducting path to the electrode active material in a good state. Consequently, the amorphous lithium ion conductor provides an advantage that the permissible temperature range can be kept broad when manufacturing and using the secondary battery 1.

If the crystalline lithium ion conductor and the amorphous lithium ion conductor are used in combination, it becomes possible to enjoy all the advantages offered by them.

While the secondary battery in accordance with the invention has been described with reference to the illustrated embodiments, the invention is not limited thereto. Individual parts constituting the secondary battery may be substituted by other arbitrary ones capable of performing similar functions. Moreover, arbitrary structural parts may be added if necessary.

Furthermore, it may be possible in the invention that only one of the cathode and the anode has the configuration set forth above. In each embodiment, the secondary battery 1 has the restrictor 8. However, in the secondary battery of the invention, the restrictor may be omitted.

EXAMPLE

Now, description will be made on concrete experimental example of the invention. In this example, the secondary battery of the first embodiment is shown, although the example is not limited thereto.

Example 1

Sample No. 1A (Invention)

Step I: First, the base member 33 was prepared by cutting a substrate having a concave structure (a plurality of concave portions 331) into a disc-shape, as shown in FIG. 2. In this regard, it is to be noted that the substrate has an average thickness of about 150 μm and a concave portion occupation percentage of 70% in a plan view.

Step II: Next, the female mold 500 having a cylindrical hole of 1.2 cm in diameter as shown in FIG. 7 was prepared for use. In a state that the lower male mold 400 was inserted into the cylindrical hole of the female mold 500, the base member 33 was inserted into the cylindrical hole of the female mold 500.

In this process, the base member 33 is inserted into the cylindrical hole in such a manner that the concave portions 331 of the base member 33 are faced upwardly (that is, in such a manner that the major surface of the base member 33 is faced upwardly).

Further, an electrode mixture material (electrode material) was prepared by mixing $\delta\text{-Ag}_{0.7}V_2O_5$ (cathode active material) particles having an average particle size of 5 μm and $Ag_6I_4WO_4$ (solid electrolyte) particles having an average particle size of 5 μm in a ratio of 5:5 by weight. Thereafter, 65 mg of the electrode mixture material was filled in the cylindrical hole and a top surface of a layer (electrode material layer) formed of the electrode mixture material was leveled.

Step III: Next, the upper male mold 600 was inserted into the cylindrical hole and pressed at a pressure of 1 ton/cm² to form a disc-shaped cathode. The thus obtained cathode had an average thickness of about 110 μm. Thereafter, the upper male mold 600 is removed from the female mold 500.

Step IV: Next, 100 mg of the $Ag_6I_4WO_4$ (solid electrolyte) particles were filled in the cylindrical hole without having to remove the cathode, and then a top surface of a layer formed of the $Ag_6I_4WO_4$ particles was leveled. Then, an anode produced in advance in the same manner as the cathode was inserted into the cylindrical hole so as to be placed on the particles.

Step V: Next, the upper male mold 600 was inserted into the cylindrical hole again and pressed at a pressure of 3 tons/cm² to produce a laminated body (battery element) 2. The thus obtained laminated body 2 had an electrolyte layer 5 whose average thickness was about 150 μm.

Step VI: Next, the laminated body 2 was taken out from the female mold 500 and copper foil lead plates were attached to the cathode and the anode by spot welding, thereby forming a cathode lead and an anode lead.

Step VII: Next, ethylene-vinyl acetate copolymer-based hot-melt resin having a melting temperature of about 100° C. was supplied in a molten state by an application method so that it could cover almost all of the laminated body 2. Thereafter, the hot-melt resin was cooled and solidified to form a restrictor 8 compressing the laminated body 2. The thus formed restrictor 8 had an average thickness of about 110 μm.

It took about 60 minutes to supply the hot-melt resin after removal of the laminated body 2 from the female mold 500. When the average thickness of the laminated body 2 immediately after the step V was defined as A (μm) and the average thickness of the laminated body 2 immediately before the present step VII was defined as B (μm), the relationship B/A was equal to 1.03.

Figure 5:
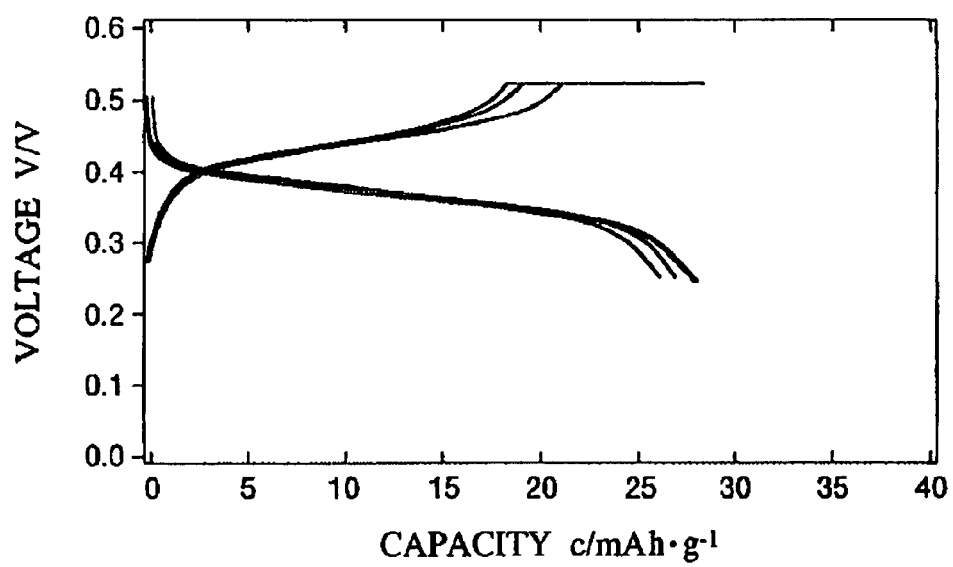
FIG. 5 is a graph showing the charge-discharge behavior in charge-discharge cycles of the secondary battery of Sample No. 1A (Invention).

The secondary battery 1 as shown in FIG. 1 was obtained through the steps set forth above. The charge-discharge behavior of the thus obtained secondary battery 1 was examined by a charge-discharge cycle test, the results (charge-discharge characteristics) of which are shown in FIG. 5.

The charge-discharge characteristics were measured by charging the battery up to 0.55 V at the constant current density of 100 μA/cm², stopping the charge operation at the moment when the electric current became equal to 20 μA, and then discharging the battery at the constant current density of 100 μA/cm². The secondary battery had a discharge capacity of about 25 mAh/gr.

Figure 6:
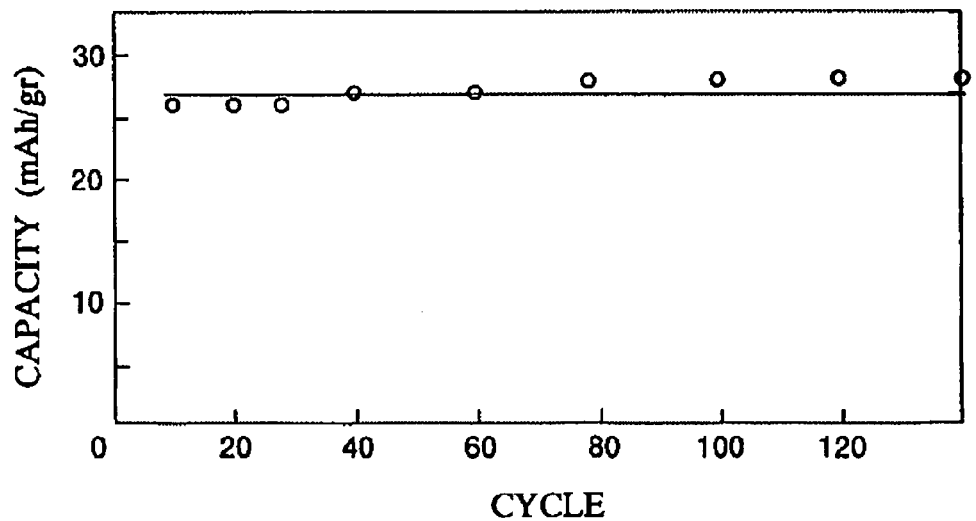
FIG. 6 is a graph showing the variation in discharge capacity over the lapse of discharge cycles of the secondary battery of the Sample No. 1A (Invention).

Further, the variation in discharge capacity over the lapse of charge-discharge cycles is illustrated in FIG. 6. Referring to FIG. 6, it can be seen that the discharge capacity was hardly reduced but slightly increased along with the lapse of charge-discharge cycles.

Sample No. 1B (Comparative Example)

The laminated body (battery element) was produced in the same manner as applied to the Sample No. 1A, i.e., the laminated body obtained through the Steps I to V, except that a base member having no concave portion was used. This laminated body was received in the coin battery container (CR1616-type) as shown in FIG. 9 and a secondary battery (coin-type secondary battery) was manufactured by pressing the sealing plate.

The discharge behavior of the thus obtained secondary battery was examined by a charge-discharge cycle test in the same manner as applied to the Sample No. 1A.

As is apparent from the results of the Example 1, in the case of the secondary battery of the Sample No. 1A in which the base member having the concave structure was used and the laminated body was covered with hot-melt resin, the battery capacity was scarcely reduced over the lapse of charge-discharge cycles.

In contrast, the secondary battery of the Sample No. 1B in which the base member having no concave structure was used and the laminated body was not covered with hot-melt resin (the laminated body was not compressed in its entirety) exhibits such charge-discharge characteristics that the discharge capacity thereof was decreased with the lapse of charge-discharge cycles.

As described hereinabove, with the secondary battery (all-solid secondary battery) of the invention, it is possible to prevent the breakage of the electronic bond which would generate in the peripheral portion of the electrodes easily. This makes it possible to avoid the reduction in battery capacity over the lapse of charge-discharge cycles.

Furthermore, in the Example set forth above, use of the base member arranged within each electrode makes it possible to prevent or suppress the expansion of the electrodes and also to keep the current density within the electrodes uniform (to reduce uneven distribution of the electric current). It is supposed that this improves the characteristics of the secondary battery to a great extent.

As set forth above, the invention clarifies the cause of interim reduction in discharge capacity over the lapse of charge-discharge cycles that does matter in the conventional secondary battery (all-solid secondary battery) using electrolyte particles. By proposing a configuration (battery configuration) that can eliminate the cause of capacity reduction, the invention is capable of preventing reduction in battery discharge capacity over the lapse of charge-discharge cycles.

Thus, the invention provides a technology that assists in improving safety and reliability of a secondary battery, the advent of which has been requested in the general market.

What is claimed is:

1. A secondary battery, comprising:
   a first electrode layer;
   a second electrode layer; and
   an electrolyte layer provided between the first and second electrode layers, the electrolyte layer including electrolyte particles,
   wherein at least one of the first and second electrode layers includes a base member having a major surface on which a plurality of concave portions are formed so that the base member has a honeycomb structure or a pinholder-shape structure and an electrode material filled in at least the concave portions so as to extend from the honey comb structure or the pinholder-shape structure toward the electrolyte layer and form an electrode material layer, the major surface facing to the electrolyte layer,
   wherein an average depth of the concave portions is in the range of 50 to 400 μm,
   wherein an occupation percentage of the concave portions with respect to the major surface of the base member in a plan view is 25 to 85%, and
   wherein an average thickness of the electrode material layer is in the range of 5 to 120 μm.

2. The secondary battery as claimed in claim 1, wherein the base member is provided for preventing or suppressing expansion of the electrode material in the plane direction of the electrode layer.

3. The secondary battery as claimed in claim 1, wherein the base member has a circumference surface thereof, and at least the circumference surface has conductivity for making the current density in the electrode layer uniform.

4. The secondary battery as claimed in claim 1, wherein the electrode material contains an electrode active material and a solid electrolyte material.

5. The secondary battery as claimed in claim 1, wherein the electrolyte particles are composed of a silver ion conductor, a lithium ion conductor, or a mixture thereof.

6. A method for manufacturing a secondary battery including a laminated body having a first electrode layer, a second electrode layer and an electrolyte layer provided between the first and second electrode layers, the electrolyte layer including electrolyte particles, wherein at least one of the first and second electrode layers includes a base member having a major surface on which a plurality of concave portions are formed so that the base member has a honeycomb structure or a pinholder-shape structure and an electrode material filled in at least the concave portions so as to extend from the honey comb structure or the pinholder-shape structure toward the electrolyte layer and form an electrode material layer, the major surface facing to the electrolyte layer, wherein an average depth of the concave portions is in the range of 50 to 400 μm, wherein an occupation percentage of the concave portions with respect to the major surface of the base member in a plan view is 25 to 85% and wherein an average thickness of the electrode material layer is in the range of 5 to 120 μm, the method comprising:
   preparing the first and second electrode layers and the electrolyte particles;
   providing the electrolyte particles onto the first electrode layer;
   providing the second electrode layer onto the electrolyte particles;
   pressing the second electrode layer toward the first electrode layer so that the electrolyte layer is formed, and the first and second electrode layers and the electrolyte layer are joined together to obtain the laminated body,
   wherein the electrode layer is formed through a method which comprises preparing the base member and providing an electrode material layer including the electrode material onto the major surface of the base member.

7. The method for manufacturing a secondary battery as claimed in claim 6, wherein the laminated body has an end portion and a restrictor provided so as to cover at least the end portion of the laminated body for restricting expansion of the electrolyte layer in the plane direction thereof, and
   wherein the method further comprises providing an insulating material in a liquid state on the laminated body and then solidifying the insulating material in a liquid state to obtain the restrictor.

8. The method for manufacturing a secondary battery as claimed in claim 6, wherein the electrode layer is formed by pressing the electrode material layer against the major surface of the base member.

9. The method for manufacturing a secondary battery as claimed in claim 6, wherein the electrode layer is formed by applying a liquid material containing the electrode material onto the major surface of the base member.

10. The method for manufacturing a secondary battery as claimed in claim 9, wherein the liquid material is applied by a screen printing.

11. The secondary battery as claimed in claim 1, wherein the base member is constituted of insulating materials.

12. The secondary battery as claimed in claim 1, wherein the electrode material contains an electrode active material and a solid electrolyte material, the solid electrolyte material being identical to a constituent material of the electrolyte layer.

13. The secondary battery as claimed in claim 12, wherein the solid electrolyte material is an iodinated silver tungstate ($Ag_6I_4WO_4$).

14. The secondary battery as claimed in claim 13, wherein an average particle size of the solid electrolyte is in the range of 0.1 to 10 μm.

15. The secondary battery as claimed in claim 13, wherein the electrode active material is a δ-type silver vanadate ($\delta\text{-}Ag_{0.7}V_2O_5$).

* * * * *